United States Patent [19]

Svensson

[11] Patent Number: 4,958,979
[45] Date of Patent: Sep. 25, 1990

[54] ARRANGEMENT FOR A LIFT ADAPTED TO A MOTOR VEHICLE

[76] Inventor: Ingemar Svensson, Bentzel's 22, 44300 Lerum, Sweden

[21] Appl. No.: 346,834

[22] PCT Filed: Nov. 9, 1987

[86] PCT No.: PCT/SE87/00523
§ 371 Date: Apr. 19, 1989
§ 102(e) Date: Apr. 19, 1989

[87] PCT Pub. No.: WO88/03484
PCT Pub. Date: May 19, 1988

[30] Foreign Application Priority Data
Nov. 10, 1986 [SE] Sweden .................... 8604797-4

[51] Int. Cl.$^5$ ............................................. B60P 1/44
[52] U.S. Cl. ......................................... 414/549; 182/88; 182/158; 187/9 R; 187/18; 254/9 C; 254/122; 414/558; 414/921
[58] Field of Search ............... 414/549, 552, 558, 921, 414/540, 541, 495, 546; 254/2 C, 2 R, 98, 9 C, 9 R, 122; 187/9 R, 18, 8.71, 8.72, 8.57; 182/69, 88, 157, 158

[56] References Cited

U.S. PATENT DOCUMENTS

| | | | |
|---|---|---|---|
| 3,498,481 | 3/1970 | Size | 414/558 |
| 3,912,048 | 10/1975 | Manning | 414/541 |
| 4,058,228 | 11/1977 | Hall | 414/549 |
| 4,134,504 | 1/1979 | Salas et al. | 414/558 |
| 4,180,366 | 12/1979 | Roth et al. | 414/540 |
| 4,407,623 | 10/1983 | Parks | 414/921 X |
| 4,579,503 | 4/1986 | Disque | 414/558 |

FOREIGN PATENT DOCUMENTS 3325036 1/1985 Fed. Rep. of Germany ...... 414/921

Primary Examiner—David A. Bucci
Attorney, Agent, or Firm—Dvorak and Traub

[57] ABSTRACT

Arrangement for a lift adapted to a motor vehicle, comprising a lifting platform capable of moving between the vehicle and a floor. The invention provides a simple device for achieving a reliable and efficient lift arrangement, for example, for use by individuals in wheelchairs who wish to move between the inside and the outside of a vehicle without the help of an assistant, and without additional ramp or lift arrangements. The platform is attached via a scissor mechanism to a source of power for the platform, so that the platform, upon actuation of the power source, moves between a lower and an upper position, one of which at least is situated at a different level with respect to that of the attachment of the scissor mechanism to the source of power.

7 Claims, 8 Drawing Sheets

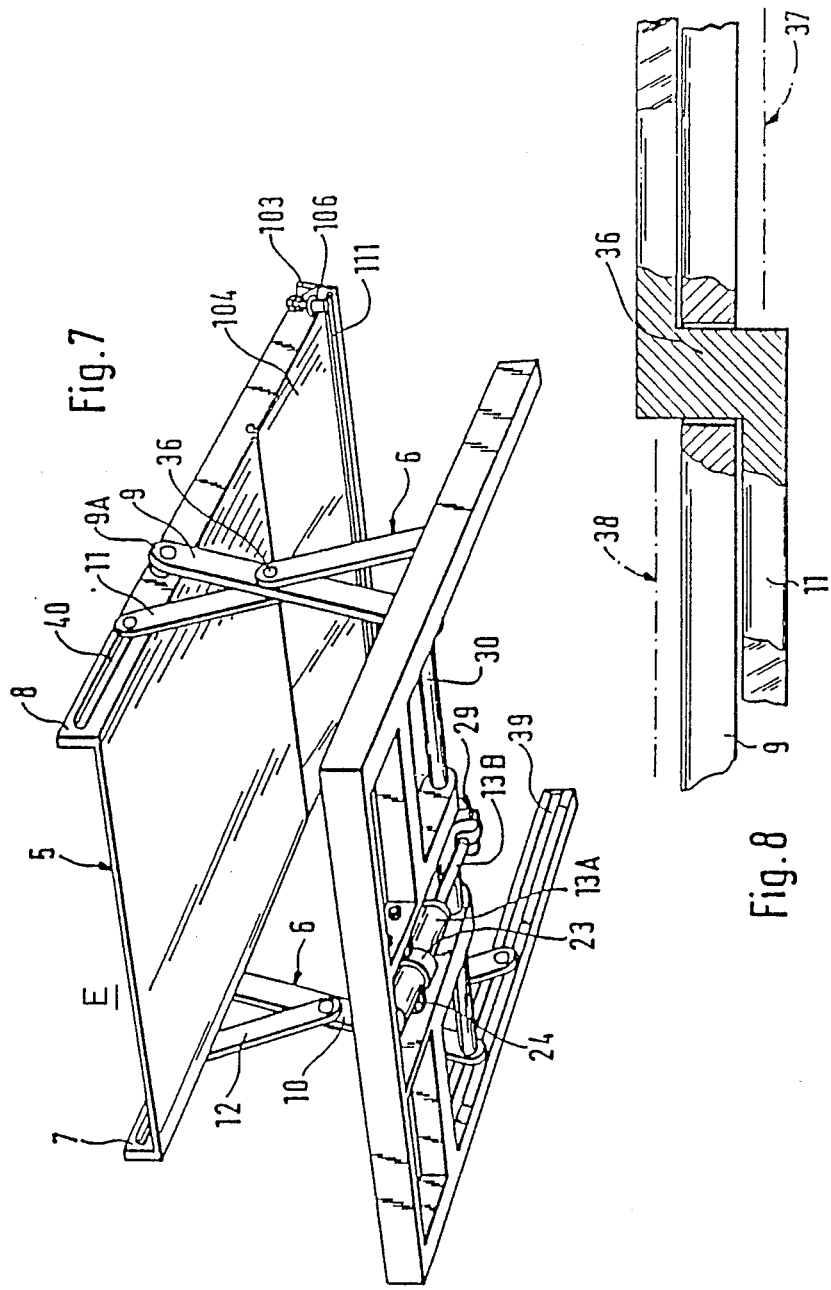

ARRANGEMENT FOR A LIFT ADAPTED TO A MOTOR VEHICLE

SUMMARY OF THE INVENTION the present invention relates to an arrangement for a lift adapted to a motor vehicle, which lift comprises a lifting platform capable of moving between the vehicle and a floor.

The principal object of the present invention is to make available an arrangement of the kind indicated above which is simple, compact, reliable and durable and is easy to operate.

Said object is achieved by means of an arrangement in accordance with the present invention, which is characterized essentially in that the platform is attached via a scissor mechanism to a source of power for the platform, so that the platform, upon actuation of said source of power, will move between a lower and an upper end position, one of which at least is situated at a different level to that of the attachment of the scissor mechanism to the source of power.

BRIEF DESCRIPTION OF THE DRAWINGS

The invention is described below in terms of a preferred illustrative embodiment, in conjunction with which reference is made to the accompanying drawings, in which:

FIG. 7 illustrates the lift arrangement viewed from below;

FIG. 8 illustrates a part of a scissor mechanism forming part of the lift arrangement;

DESCRIPTION OF THE PREFERRED EMBODIMENT

Figure 5:
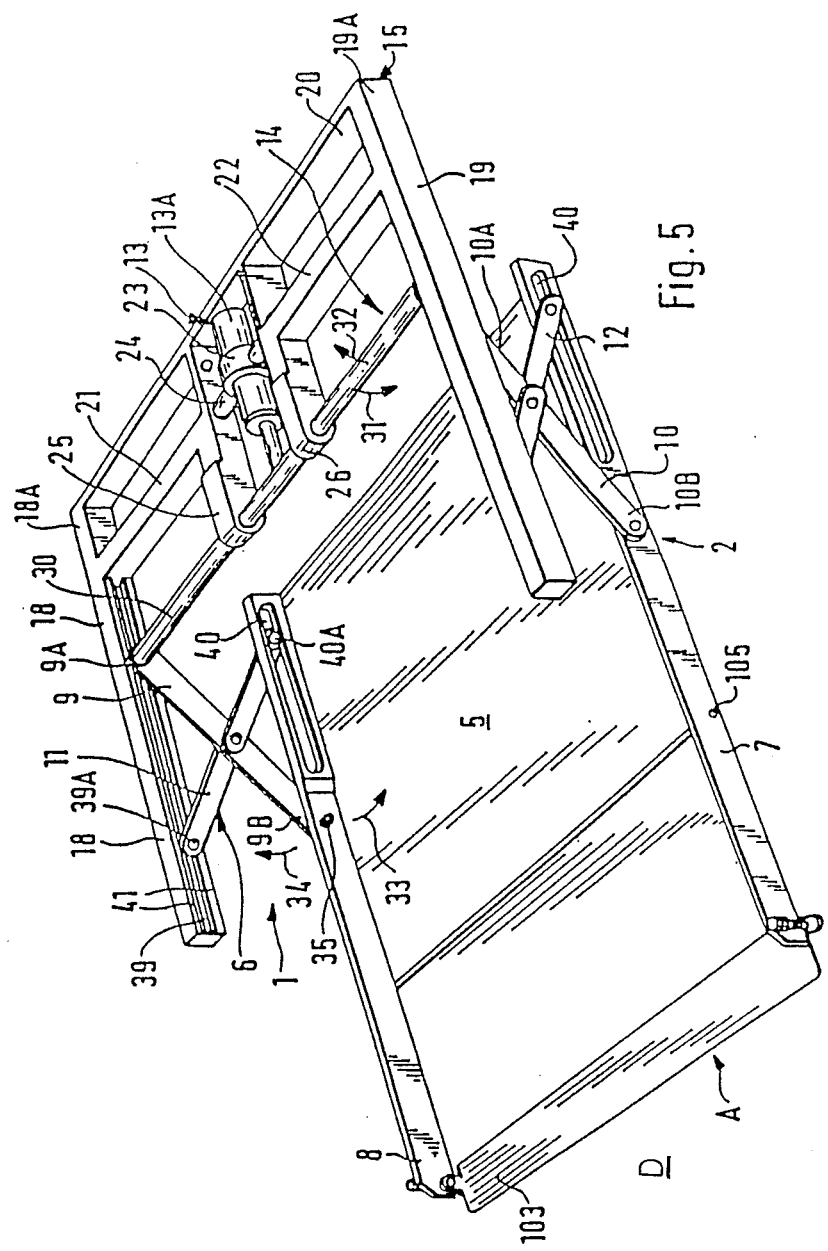
FIG. 5 illustrates the lift arrangement with its platform in the lowered position.
Figure 6:
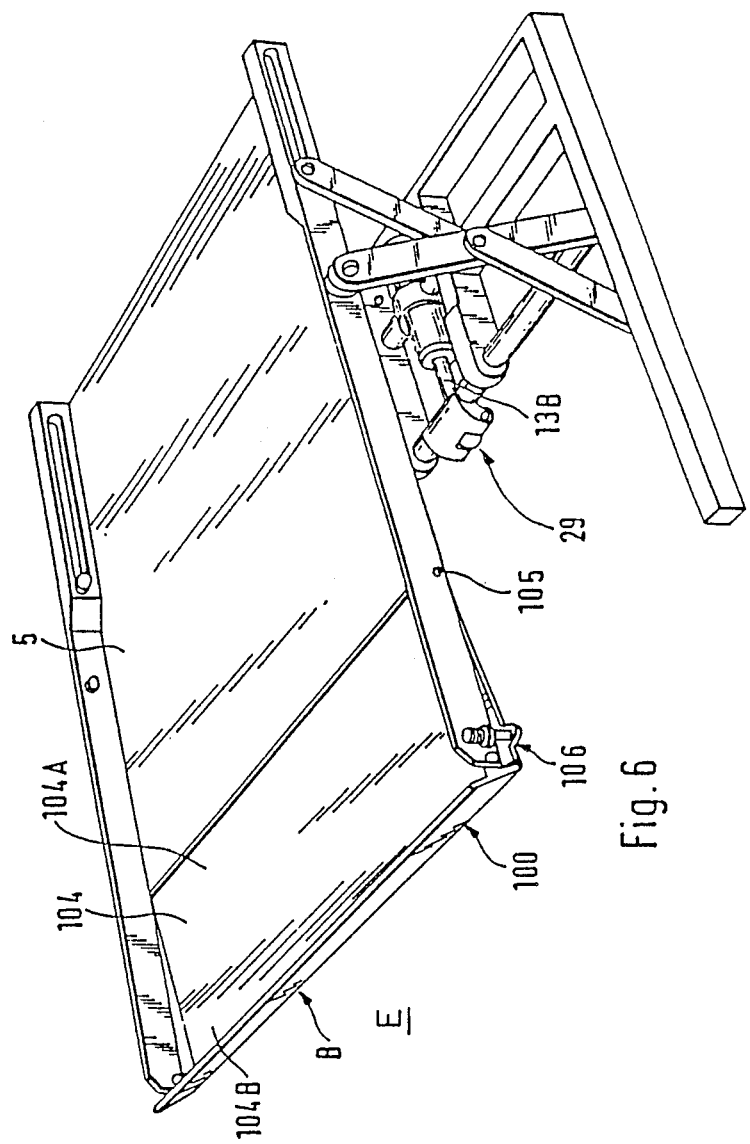
FIG. 6 illustrates the lift arrangement with its platform in the raised position and viewed from above.

An arrangement 1 for a passenger lift 2 executed in accordance with the present invention, which lift is adapted to a motor vehicle and comprises a lift platform 5 capable of moving between the vehicle 3 and a floor 4, includes a scissor mechanism 6. The platform 5 is connected via said scissor mechanism 6, which can include a supporting link 9, 10 and a guide link 11, 12 situated on the two lateral edges 7, 8 of the platform, to a suitable source of power 13, which enables the platform 5 to be actuated in order to achieve the desired raising of same. It is possible in this way, by actuating said source of power 13, to cause the platform 5 to be displaced between a lower end position D and an upper end position E, as illustrated in FIG. 5 and FIG. 6, for example, At least one of said end positions D, E is situated at a different level A and B to the level C at which the connection 14 between the scissor mechanism 6 and the source of power 13 is situated.

The platform 5 is conveniently so arranged as to be capable of moving between a level A and a level B respectively situated below and above said drive connection 14 and the level C for same, as illustrated in the drawings.

The attitude of said platform 5 is essentially horizontal during the period for which it is being caused to move between said end positions D and E, provided, of course, that the vehicle 3 is standing on a level floor 4, thanks to the presence of said scissor mechanism 6.

Figure 1:
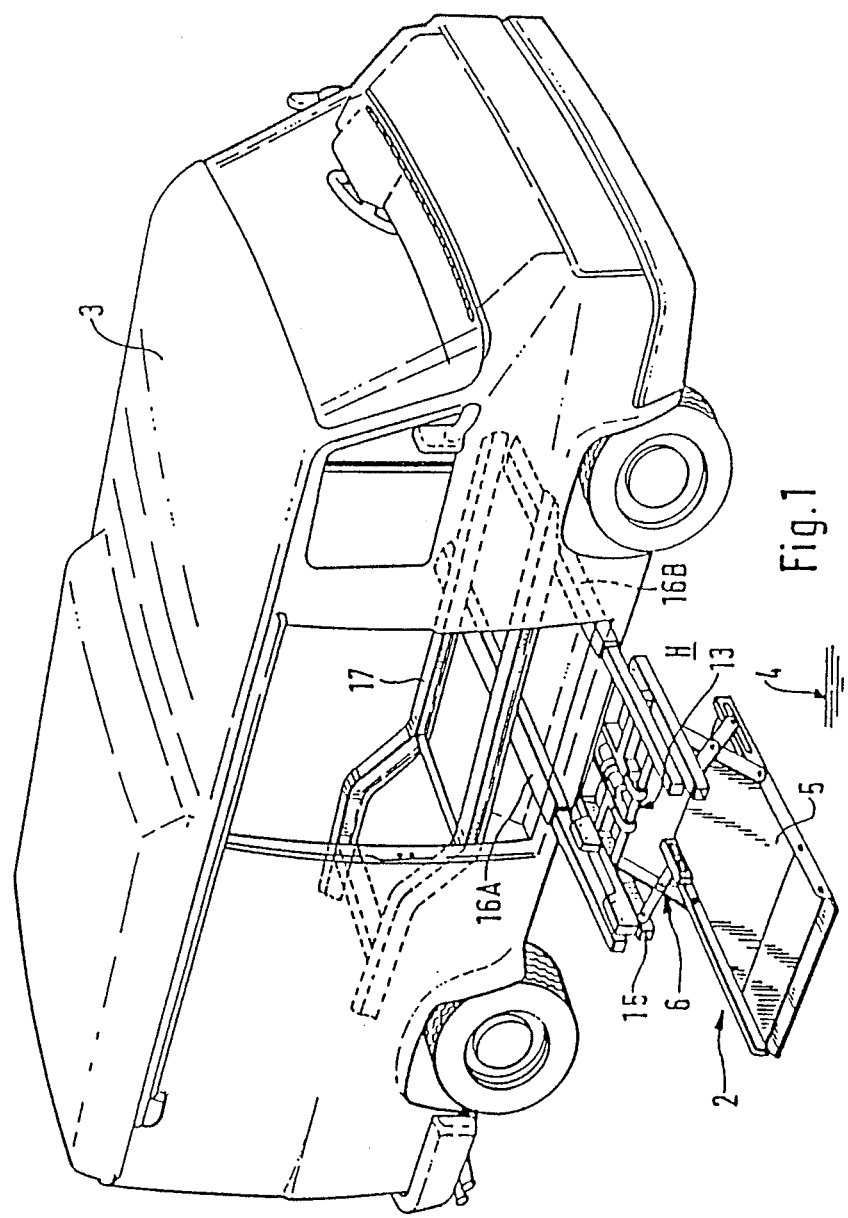
FIG. 1 illustrates the invention mounted on a vehicle.
Figure 2:
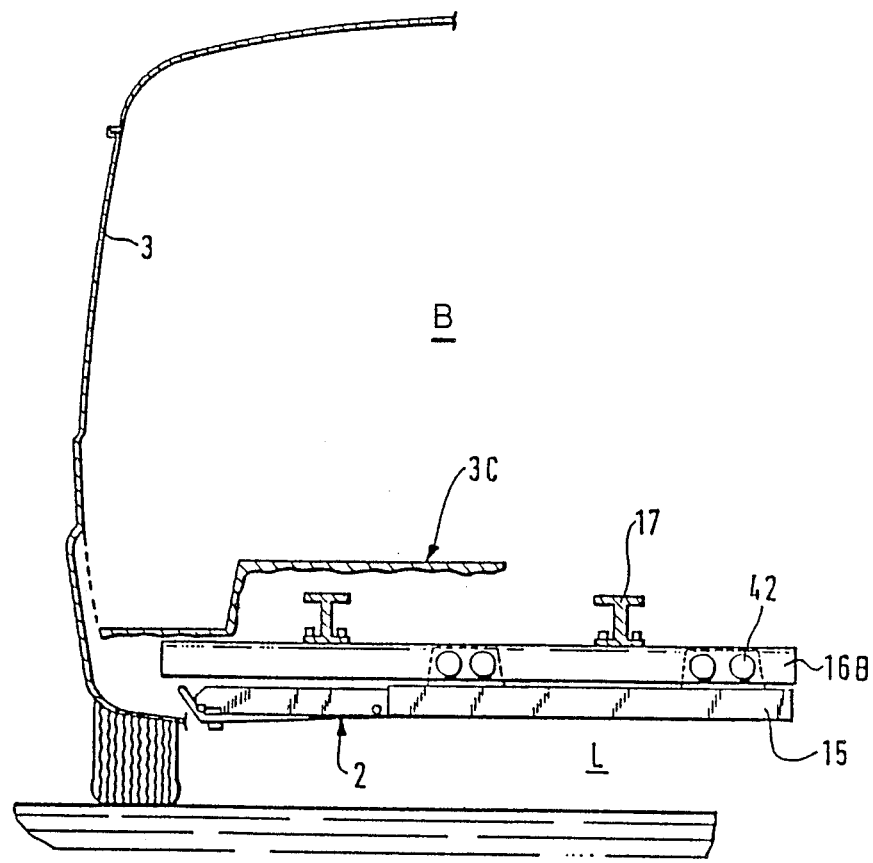
FIG. 2 illustrates a section through the lift arrangement in a withdrawn storage position beneath the vehicle.
Figure 3:
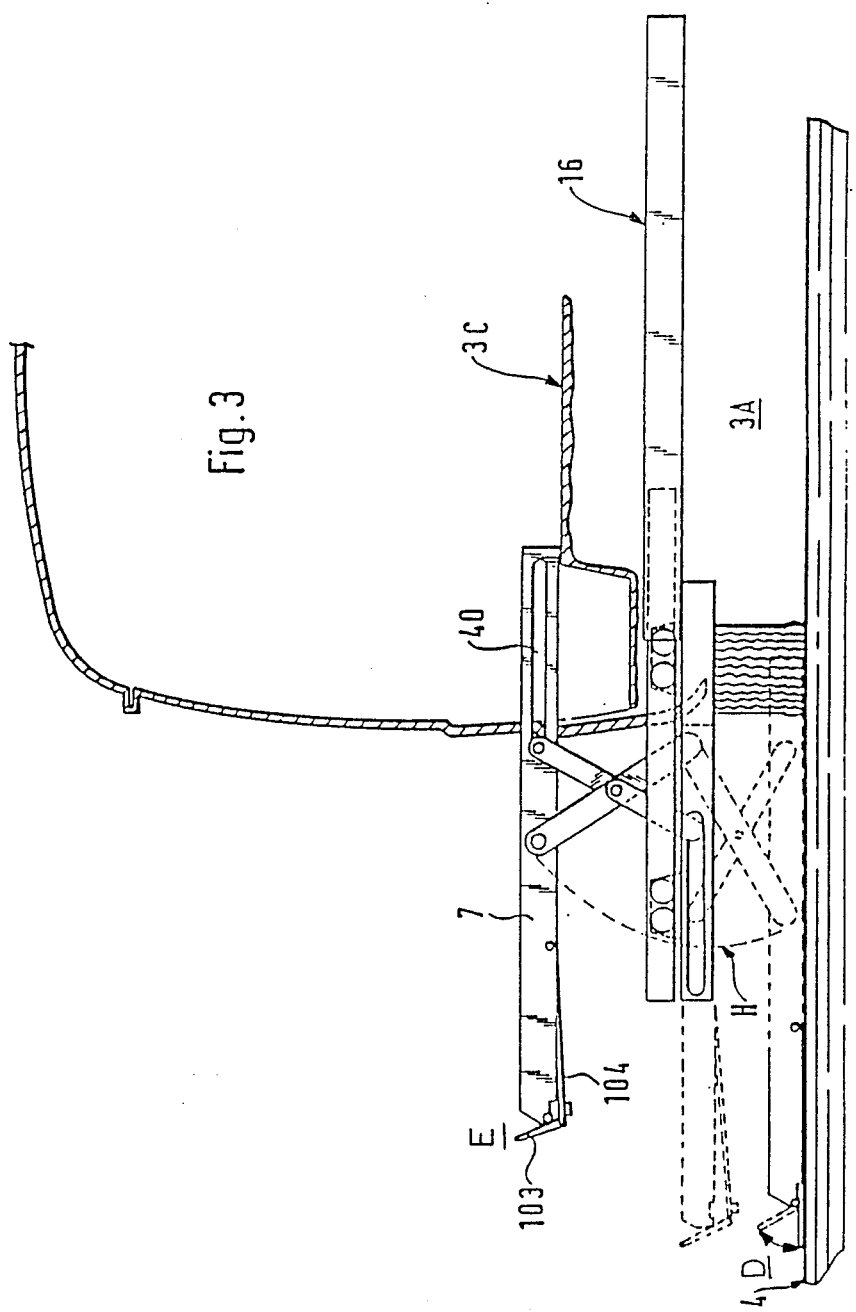
FIG. 3 illustrates the lift arrangement extended to a lifting position next to the vehicle.
Figure 4:
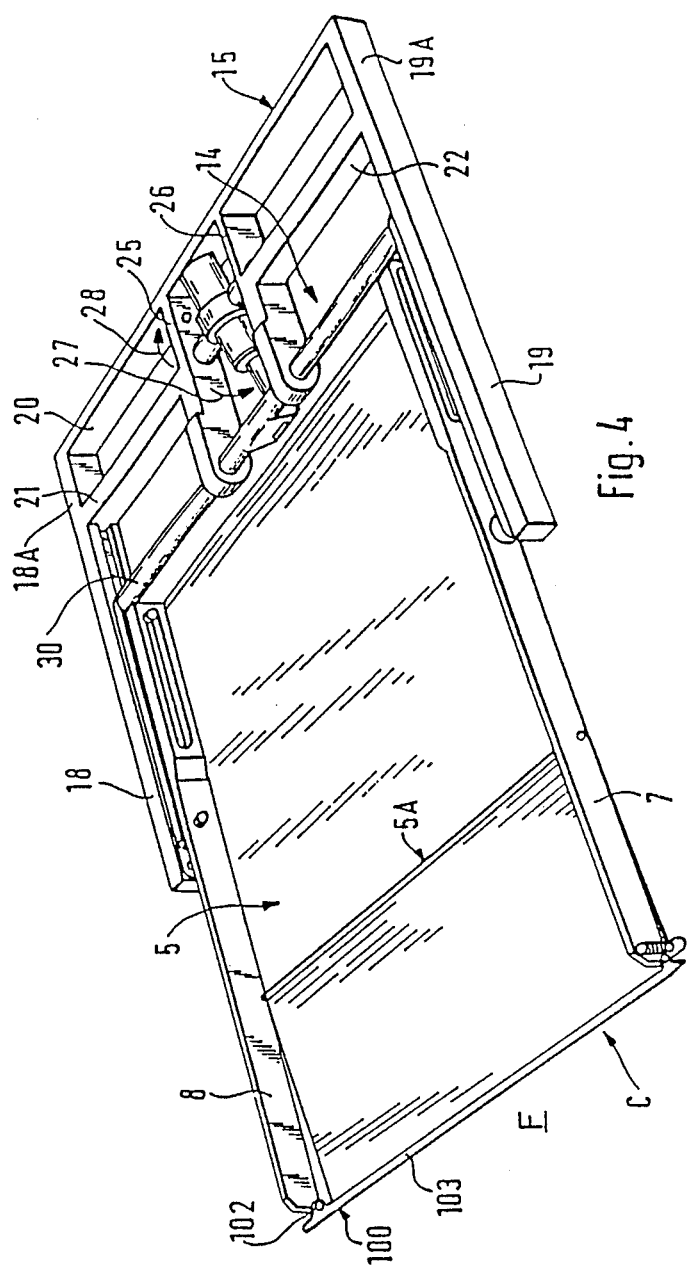
FIG. 4 illustrates a perspective view of the lift arrangement alone, with its platform displaced to an intermediate position.

The platform 5, which in the embodiment illustrated is in the form of a flat sheet, but which may naturally exhibit some other desired form, including a form resembling a chair seat or some other support for a seated individual, is appropriately supported by a frame 15, which in turn may be supported by a guide arrangement 16 situated, for example, on the underside 3A of a vehicle, which guide arrangement may consist of two guide channels 16A, 16B, for example, attached to the chassis frame 17 of the vehicle, along which channels the lifting frame 15 is supported in such a way as to be capable of being freely guided, conveniently in a telescopic fashion, between a storage position L in which it is withdrawn into a position close to the vehicle 3, as illustrated in FIG. 2, for example, and an extended lifting position H in which it is extended, for example, laterally away from the vehicle and to the outside of same, as illustrated in FIG. 1 and FIG. 3, for example.

The frame 15 can exhibit a peripheral form of 'C'-section and can be constructed from channel shaped lateral members 18, 19 with transverse members 20, 21, 22 attached to it at one of its free ends 18A, 19A.

A hydraulic cylinder arrangement 13 or some other appropriate jack 13 powered by fluid or actuated mechanically can be supported, for example, in such a way that it is free to pivot in the vicinity of said transverse members 20, 21, 22. For example, a piston cylinder 13A can be supported by a bearing 23 which encloses the piston cylinder 13A, and which, via projecting bearing shafts 24, which are supported by bracing struts 25, 26 attached to said transverse members 20–22, are supported in such a way that they are free to pivot in the direction of the arrows 27, 28. A piston rod 13B which is capable of being caused to extend from the piston cylinder 13A, is attached via an articulated joint 29 to a shaft 30 forming part of said source of power 13, which shaft is supported by the bracing struts 25, 26 in such a way that it is free to pivot in the direction of the arrows 31, 32. Said pivot shaft 30 is rigidly connected to the free ends 9A and 10A of said scissor mechanisms 6 situated to either side of the frame 15 and the platform 5.

Actuation of the jack 13 will cause the shaft 30 to rotate in either direction 31, 32, and will cause the supporting links 9, 10 to pivot about the shaft 30 in the direction of the arrows 33, 34.

The other end 9B, 10B of the supporting links 9, 10 is pivotally attached to the two lateral edges 7, 8 of the platform via a swivelling connection 35, and said ends 9A, 10A and 9B, 10B are so arranged as to be maintained at the same level as the platform 5 and as the frame 15.

Said guide links 11, 12, which are attached to their corresponding supporting links 9, 10 via an appropriate link 36 at the point of intersection between said links 9, 11 and 10, 12, so that they can pivot in relation to one another, appropriately extend in a zig-zag fashion along the corresponding supporting link 9, 10 in a plane 37, 38 situated to either side of said supporting link 9, 10. The possibility is afforded in this way for the simple and effective connection of the end surfaces 7, 8, etc., of the platform to the frame 15.

The guide links 11, 12 are freely guided by guides 39, 40 extending along said frame 15 and end surfaces 7, 8 via guide arrangements 39A, 40A interacting with same for the purpose of maintaining the platform 5 in the desired attitude during raising of same and whilst it is being held stationary in the supporting position F and in the loading position D, E. Said guides 39, 40 can take the form of internal cavities in the lateral members 18, 19 of the frame with corresponding end walls 41, and of an elongated slot in the end walls 7, 8.

Figure 9:
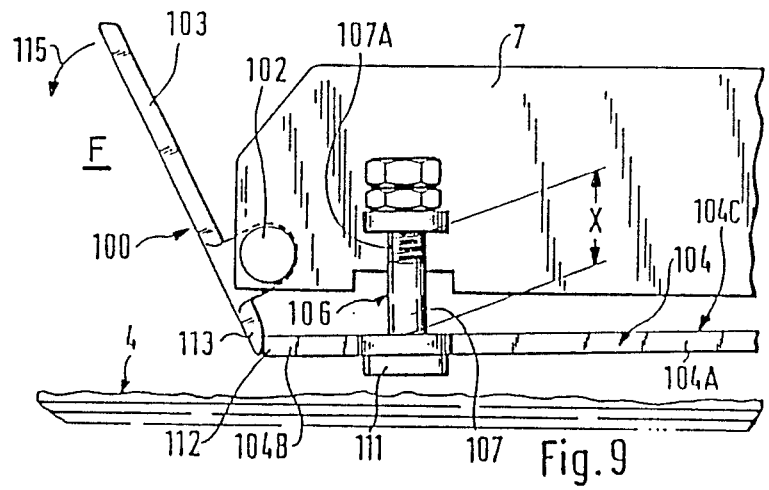
FIG. 9 illustrates an edge stop mechanism situated on the platform, in a hinged stop position.
Figure 10:
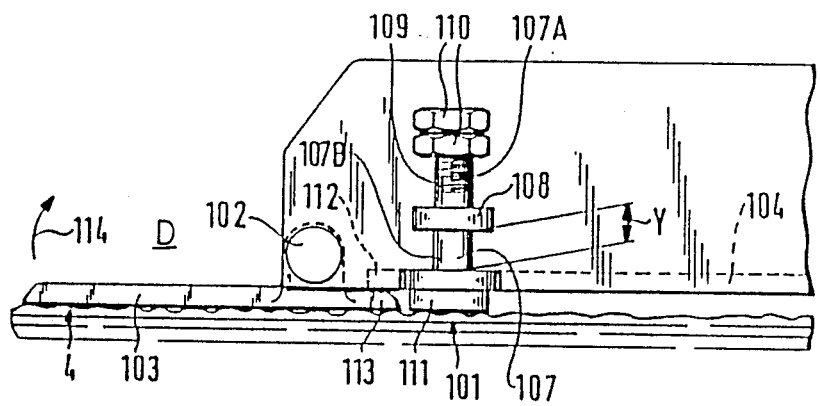
FIG. 10 illustrates said mechanism folded down in the unactuated position.

In order to prevent wheelchairs or other mobile carriages or similar objects which it is proposed to raise by means of the lift 2 from passing unintentionally beyond the front edge 5A of the platform, an edge guard 100 can be used, conveniently of the kind illustrated in detail in the drawings in FIG. 9 and FIG. 10. said edge guard 100 can comprise a mechanism which is actuated automatically when the lift 2 is operated. A stop 103, for example a plate, pivotally supported about a pivot shaft 102, is so arranged when in the raised position, as illustrated by way of example in FIG. 9, as to constitute an effective arrester device and to prevent wheelchairs, etc., from rolling from a ramp 104 adjacent to the platform 5. The ramp 104, which in turn is freely supported at its end 104A facing towards the platform 5, is supported, for example, in such a way as to pivot about a shaft 105 extending between the end surfaces 7, 8. The ramp 104 is also so arranged at its end 104B facing away from the platform 5 in such a way as to be capable of interacting with a holder 106. The holder 106 can take the form of an upright 107, for example a bolt, situated to either side of the platform 5 and attached to its end surfaces 7, 8, which upright is freely accommodated at its upper end 107A in a hole in a support bracket 108, which bracket is supported on each end surface 7, 8. A number of nuts 110 interacting with threads 109 on the upright 107 are so arranged as to function as adjustable end stops for the upright 107. The bottom ends 107B of the uprights 107 are so arranged as to be accommodated in holes in the ramp 104, and as to be connected to a suitable mounting 111, for example a strip extending between the uprights 107.

The function of said edge guard 100 can be as follows: in the raised position, as illustrated in FIG. 9, the uprights 107 are maintained at a distance from the floor 4 such that the ramp 104 rests on said mounting 111 connected to the uprights 107, and is also capable in said position of accepting a load on the upper side 104C of the ramp. The end edge 112 or some other part of the ramp 104 interacts in said raised stop position III with the inner edge 113 or some other part of the stop 103, so that this is positively maintained in an upward-hinged position, and the ramp 104 is maintained in a slightly downward-hinged attitude at a certain distance X from the attachment 108. If the platform 5 is lowered to the floor 4, the uprights 107 will be displaced successively, as illustrated in FIG. 10, in relation to the attachment 108 and will be raised when the mounting 111 with the ramp 104 makes contact with the floor 4. In conjunction with this the ramp 104 will be caused to pivot about the bearing shaft 105, and the interaction with the end 113 of the stop will cease increasingly as the platform 5 is lowered, and will finally cease entirely when the stop 103 is lying, for example, flat along the ground 4 and forms a continuation of the ramp 104, permitting comfortable passage in this loading position I between the floor 4 and the platform 5 via the stop 103 and the ramp 104. The uprights 107 will thus have been raised so that the distance Y between the ramp 104 and the attachment 108 will have reduced.

Raising of the platform 5 will mean that the ramp 104 will cause the stop to be raised in the direction of the arrow 114, before being lowered again in the direction of the arrow 115 upon lowering the platform 5.

The function of the lift arrangement 1 described above should have emerged from what is stated above, although the following brief comments may be made: the possibility is afforded in the extended position beyond the side of the vehicle, for example after displacement on rollers 42 which are supported by the frame 15, of raising the platform 5 into the desired position by actuating the driving jack 13 so that the shaft 30 is caused to rotate in the desired direction 31 and 32, depending on whether the jack 13 is caused to be shortened or lengthened. In conjunction with this the shaft 30 causes the supporting links 9, 10 to rotate in either direction 33 and 34 in order either to lower or to raise the lifting platform 5 towards said end positions D and E from its lifting position H. The possibility is thus afforded in a lower position D of driving a wheelchair or some other object onto the platform 5 directly from the floor 4, and of causing the wheelchair to advance as far as the internal space 3B of the vehicle once the platform with the wheelchair and the load supported on it have been raised to the correct level adjacent to the floor 3C of the vehicle, whilst maintaining the platform 5 in a horizontal attitude and after any necessary displacement of the platform 5 in the horizontal sense.

Maneuvering of the arrangement can be effected in an appropriate fashion, for example by means of controls which are contained within the vehicle, although the possibility is also afforded for the remote control of the arrangement, for example via portable control devices which can be carried by the person riding in the wheelchair. Doors, too, can be connected to the remote control if such technology is used.

The invention is not restricted to the illustrative embodiment described above and illustrated in the drawings, but can be modified within the scope of the Patent Claims without departing from the idea of invention.

I claim:

1. Vehicle lift arrangement, comprising: a lifting platform, a scissor mechanism, a power source located beneath said platform when said platform is in a raised position and located above said platform when said platform is in a lowered position, said lifting platform attached by said scissor mechanism to said power source, a frame for supporting said lifting platform, said frame being movable between a withdrawn storage position close to the vehicle and an extended lifting position away from the vehicle, a support link having a first and a second end, said support link forming part of said scissor mechanism and being movably engaged with said lifting platform and with said frame, and a guide link having a first and a second end, said guide link being in movable engagement with said platform and said frame.

2. Vehicle lift arrangement according to claim 1, wherein said first and second ends of said support link are maintained at the same level as said lifting platform and said frame.

3. Vehicle lift arrangement according to claim 2, further comprising a pivotally supported shaft attaching said scissor mechanism to said power source.

4. Vehicle lift arrangement according to claim 3, wherein said pivotally supported drive shaft is rigidly connected with a first end of said support link, said power source acting on and actuating said pivotally supported shaft.

5. Vehicle lift arrangement according to claim 4, further comprising an articulated link disposed at a point of intersection between said support link and said guide link.

6. Vehicle lift arrangement according to claim 5, further comprising a platform guide disposed horizontally along said platform, and a frame guide disposed horizontally along said frame, said first end of said guide link being in slidable engagement with said frame guide, and said second end of said guide link being in slidable engagement with said platform guide.

7. Vehicle lift arrangement according to claim 1, further comprising a plurality of lateral edges, said lateral edges disposed along each of a left side and a right side of said lifting platform, said lateral edges being aligned perpendicular to said lifting platform, wherein said scissor mechanism is in working engagement with said lateral edges.

* * * * *